United States Patent
Kelly et al.

(10) Patent No.: US 7,462,283 B2
(45) Date of Patent: Dec. 9, 2008

(54) SYSTEM AND METHOD FOR LIQUID FILTRATION BASED ON A NEUTRAL FILTER MATERIAL

(75) Inventors: Wayne Kelly, Prior Lake, MN (US); Donald Grant, Excellsior, MN (US); Philip Goddard, Nashua, NH (US); Volkmar Thom, Chelmsford, MA (US)

(73) Assignee: Entegris, Inc., Chaska, MN (US)

( * ) Notice: Subject to any disclaimer, the term of this patent is extended or adjusted under 35 U.S.C. 154(b) by 319 days.

(21) Appl. No.: 11/294,082

(22) Filed: Dec. 5, 2005

(65) Prior Publication Data

US 2006/0144790 A1    Jul. 6, 2006

Related U.S. Application Data

(63) Continuation-in-part of application No. 09/759,920, filed on Jan. 12, 2001, now abandoned.

(60) Provisional application No. 60/176,363, filed on Jan. 14, 2000.

(51) Int. Cl.
| | |
|---|---|
| B01D 71/06 | (2006.01) |
| B01D 63/08 | (2006.01) |
| B01D 71/40 | (2006.01) |
| B01D 71/26 | (2006.01) |
| B01D 71/34 | (2006.01) |
| B01D 61/14 | (2006.01) |

(52) U.S. Cl. .................. 210/500.38; 210/500.35; 210/500.27; 210/500.1; 210/500.42; 210/500.41; 210/500.39; 210/500.36

(58) Field of Classification Search ................ None
See application file for complete search history.

(56) References Cited

U.S. PATENT DOCUMENTS

| 4,311,573 A | 1/1982 | Mayhan |
| 4,340,479 A | 7/1982 | Pall |
| 4,431,545 A | 2/1984 | Pall et al. |
| 4,617,124 A | 10/1986 | Pall et al. |

(Continued)

FOREIGN PATENT DOCUMENTS

DE    2544117    4/1976

(Continued)

OTHER PUBLICATIONS

European Search Report, dated Mar. 28, 2007, All prior art previously cited in parent applications.

(Continued)

Primary Examiner—Krishnan S Menon
(74) Attorney, Agent, or Firm—John E. Pillion; Timothy J. King

(57) ABSTRACT

The present invention teaches, that the removal of particles of any charge from liquid stream is possible by mechanisms other than sieving with good flow and low pressure drop. The use of a weakly charged or neutral surface on the one or more filters within a pre-selected pH range is used. Consequently, particles that are much smaller than the filter pore size are captured with high efficiency. The essentially neutral or weakly charged material filter surface in the filtration liquid may be formed through the proper selection of filter material or a surface modification of the base filters(s) to create the essentially neutral or weakly charged surface.

4 Claims, 8 Drawing Sheets

U.S. PATENT DOCUMENTS

| | | | |
|---|---|---|---|
| 4,618,533 A * | 10/1986 | Steuck | 428/315.7 |
| 4,645,567 A | 2/1987 | Hou et al. | |
| 4,707,266 A | 11/1987 | Degen et al. | |
| 5,407,581 A | 4/1995 | Onodera | |
| 5,531,900 A | 7/1996 | Raghavan | |
| 5,582,725 A | 12/1996 | McCray | |
| 5,922,612 A | 7/1999 | Alder | |
| 6,312,950 B1 | 11/2001 | Ohmura | |
| 2002/0011450 A1 | 1/2002 | Kelly et al. | |

FOREIGN PATENT DOCUMENTS

| | | | |
|---|---|---|---|
| DE | 2544118 | | 4/1976 |
| DE | 2544117 A1 * | | 8/1976 |
| DE | 2544118 A1 * | | 8/1976 |
| EP | 0087228 | | 8/1983 |
| EP | 0888810 | | 1/1999 |
| WO | 0151170 A1 | | 7/2001 |

OTHER PUBLICATIONS

Kelly, W. P. et al, Effect of Surface Charge and Fluid Properties on Particle Removal Characteristics of a Surface-Optimized REB Filter, Solid State Phenomena, 2001, 271-274, vol. 76-77.

Grant, D. C., et al, Particle Capture Mechanisms in Gases and Liquids: An Analysis of Operative Mechanisms in Membrane/Fibrous Filters, 1989, 43-51, Jul./Aug.

Kelly, W. P. et al, Optimization of Filter Properties for Recirculating Etch Baths, Journal IEST, 2000, 30-40, Summer.

Kelly, W. P., et al, U.S. Appl. No. 60/176,363.

* cited by examiner

SYSTEM AND METHOD FOR LIQUID FILTRATION BASED ON A NEUTRAL FILTER MATERIAL

This application is a continuation in part of U.S. application Ser. No. 09/759,920 filed Jan. 12, 2001, now abandon, which claims priority from U.S. Provisional Application No. 60/176,363, filed Jan. 14, 2000, the contents of each incorporated by reference in their entirety into the present application.

BACKGROUND

The filtration of particulate materials from fluids has been conducted for years relying mainly on sieving mechanisms, where particles are predominantly removed based on size. Sieving by itself in many cases has not been satisfactory for liquid filtration as it provides poor or no retention for particles smaller than the pore size of the filter, as well as low flow rates requiring either large pressure gradients or large filter areas to attain a reasonable flow. However, particles can be removed from liquids relying on attractive particle-surface interactions, a practice which has long been recognized in gas filtration, where filtration mechanisms other than sieving dominate in most applications and provide enhanced filter performance. See, *Particle Capture Mechanisms in Gases and Liquids: An Analysis of Operative Mechanisms*, by Grant, et. al., 1988 Proceedings of the Institute of Environmental Sciences.

Particle-surface interactions in liquids are usually governed by electrostatic interactions and Van der Waals Forces assuming that no other highly specific interaction potentials are present (as e.g. molecular recognition, chelating functionalities etc.). Van der Waals forces are omnipresent attractive short ranged forces acting between two materials of any kind and will thus always represent attractive interactions. Electrostatic interactions on the other hand, will be attractive, repulsive or non-existent dependent on the sign of the electrostatic potential of the two materials in question. It is common knowledge, that like-charged materials will exhibit repulsive electrostatic interactions between each other, whereas counter-charged material will exhibit attractive electrostatic interactions between one another. This knowledge has been exploited in the filtration of liquids, where the filter material exhibiting electrostatic potential is capable of attracting and successfully retaining countercharged particles. The obvious limitation of these charged filters are the repulsive electrostatic interactions of the filter material with like-charged particles and the resulting poor retention for the same.

The basis of this invention is the realization that when one of the material surfaces in question is neutral in the liquid of use (here the filter material), no adverse electrostatic interactions will be present between the filter material and the particle material and attractive Van der Waals forces will govern the interaction between the filter material and particle material leading to the retention of particles of any charge characteristic, positive, negative, or neutral. Therefore, in providing a filter material that exhibits no, or essentially no, electrostatic potential in the liquid to be filtered (i.e. it is a neutral surface), particles of any electrostatic character will be attracted by the filter material leading to enhanced retention and filtration beyond that currently obtained with conventional sieving only filters.

The electrostatic potential of materials in liquids are governed by two main phenomena, (i) the dissociation/association of functional groups (acids or bases) leading to a charge, or (ii) the adsorption of (charged) ionic species from the liquid. For example, in aqueous media, materials without any functional groups at the material surface usually exhibit a negative electrostatic potential in basic or neutral solutions (pH>5-7) and positive electrostatic potential in acidic solutions (pH<5-7) due to the adsorption of hydroxyl (negatively charged: $OH^-$) or hydronium ions (positively charged: $H^+$). Independent of the character of the liquid (aqueous or non-aqueous) charged ionic species present in the filtration liquid might also adsorb to the material surface and therefore alter its electrostatic potential.

It is therefore important to realize, that a material attains a different electrostatic potential in dependence on the properties of the liquid it is immersed in. The electrostatic potential of a material in a liquid will depend on properties of the liquid such as (i) its proton donor/acceptor capability, (ii) its dielectric constant, (iii) the concentration and kind of ionic species present. Nevertheless, through the use of appropriate materials or surface modifications of the same, one can adjust the electrostatic potential of a material in a given liquid to be essentially zero thereby creating an essentially neutral surface.

Based on this finding, this invention teaches that a filter material can be selectively adjusted for a given fluid in a given pH range to attract particles of any electrostatic character and can therefore effectively retain particles smaller than the pore size of the filter based on attractive interactions between the particle and the filter material in any given liquid.

SUMMARY

The present invention provides a filter with high particle capture (Log reduction value (LRV)>3, preferably >5, more preferably >10) with low pressure drops and high flow. For example, the present invention provides a filter with a traditional pore size rating of 0.3 microns with an LRV of greater than 3 for 0.1 microns particles with a pressure drop which is less than 1/10 that of a 0.1 microns rated "sieving filter" (i.e. a filter with a nominal or rated pore size of 0.1 microns). At the same time, the 0.1 microns "sieving filter" has an LRV of less than 3, generally about 2 for 0.1 microns particles.

The present invention uses a weakly charged or neutral filter (surface). The present invention creates such a filter surface by selecting a material (surface) with an isoelectric point (IEP) or point of zero charge (PZC) in the liquid it filters, thus maintaining a neutral or weakly charged surface which provides the enhanced retention performance of the filter of the present invention. Preferably, it can be used in aqueous and non-aqueous fluids. In aqueous fluids, it can have a substantially neutral surface over a broad pH range or if desired a selected narrow pH range. In non-aqueous fluids, it is capable of maintaining a substantially neutral surface over a wide range of ionic strength fluids.

In one embodiment of the present invention, there is provided a filter that has a surface that is substantially neutral in charge in the fluid in which it is used.

In another embodiment of the present invention, there is provided a filter that has a surface that is substantially neutral in charge in an aqueous fluid over at least a range of pH and preferably under all pH conditions.

A further embodiment of present invention is to utilize a filter having an IEP within the selected or intended operating range of pH or ionic strength such that the filter surface either maintains a neutral or weak charge or does not acquire a highly charged surface within the selected pH range or ionic strength.

Another embodiment of the present invention is to utilize a filter having an IEP in the pH of the aqueous liquid in which it is used. In this approach, the filter surface is matched to a specific liquid in which the pH is fixed and the filter surface remains neutral.

A further embodiment of the present invention is to utilize a filter having an IEP at the ionic strength of the non-aqueous liquid in which it is used. In this approach, the filter surface is matched to a specific liquid in which the ionic strength is fixed and the filter surface remains neutral.

An alternative embodiment of present invention is to utilize two or more filters in a composite filter, each with a different IEP. This allows for the use over a broad range of pH for aqueous fluids and ionic strengths for non-aqueous fluids.

A further embodiment of present invention is to utilize a filter having a Zeta Potential of between about 10 and −10 millivolts, preferably, between 5 and −5 millivolts within the selected fluid such that the filter surface either maintains a neutral or weak charge or does not acquire a highly charged surface within the selected fluid.

In an additional embodiment of the present invention is a method of filtration of liquids comprising selecting a fluid containing one or more contaminants to be removed, forming one or more porous filters, said one or more filters having surfaces which are substantially neutral within the selected fluid and passing the fluid through the one or more filters to remove the contaminants.

DESCRIPTION

Figure 1:
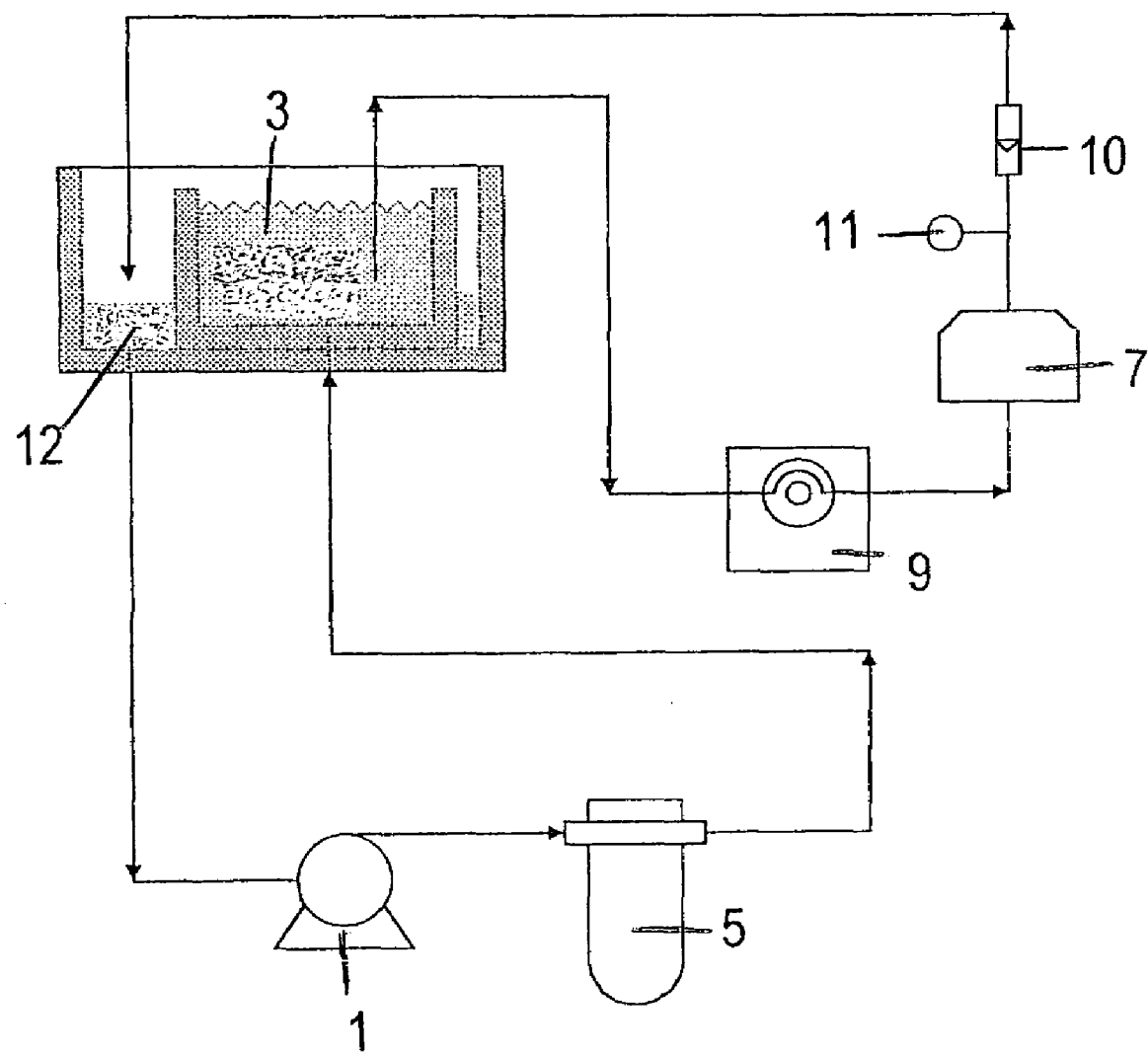
FIG. 1 Test system for tests in Hydrofluoric (HF) Acid for filters assembled in cartridges.

This invention relates to a system and method for the filtration of particulates from fluids using porous media. More specifically, it relates to a filter and method of filtration where particles smaller than the pore size of the porous medium used as the filter are effectively removed due to a non-sieving related mechanism.

The present invention teaches, that the removal of particles of any charge from liquid stream is possible by mechanisms other than sieving when the electrostatic interaction between filter material surface and particle surface are small enough so that particles are captured by attractive Van der Waals forces. The use of a weakly charged or neutral surface stems from the concept that the magnitude of the repulsive force between two surfaces is related to the product of the charge densities on the two surfaces. This means that if one surface is substantially neutral and therefore has no charge, the repulsive force is eliminated, regardless of the extent of charge on the particle surface. Consequently, particles that are much smaller than the filter pore size are captured with high efficiency by the omnipresent attractive Van der Waals forces. This goal is achieved by providing an essentially neutral or weakly charged material filter surface in the filtration liquid.

Because such a "neutral" filter does not rely on sieving alone, the pore size can be enlarged without loss of performance as compared to a conventional, sieving only chemical filter, allowing for high particle retention with high flow permeability.

Almost all materials in contact with a liquid acquire an electrostatic potential, due to the presence of immobilized charged groups or adsorbed charged ionic species at the surface of those materials. The Zeta Potential (ZP) of a material surface is a property used to characterize its electrostatic (surface) potential or surface charge density. The ZP of a material (surface) has the same sign as the overall surface charge of this material and is generally proportional to the surface charge density. Consequently, the presence or absence of charged groups on the surface of materials such as revealed by their zeta potential will correlate directly with their filter performance.

Different electrokinetic phenomena such as Electrophoresis (the movement of charged colloidal particles in electric field) or Streaming Potential (forcing a liquid through a capillary or porous medium induces a difference of electric potentials) are commonly used to determine the ZP of a material. The ZP of particles is e.g. commonly measured by standard measurement systems (e.g. Zetasizer, Malvern Instruments) as the stability of a particle suspension (i.e. the ability to not agglomerate) depends directly on the ZP of the particles in the liquid they are suspended in. When the absolute value of the particle ZP is above a certain threshold (e.g. 50 mV) a suspension is very stable due to electrostatic repulsion between the particles; however, when the ZP is close to zero particles will agglomerate (see. Robert Hunter, *Zeta Potential in Colloid Science*, Academic Press, 1984).

The ZP of a non-conducting material is directly proportional to the electrostatic potential of the material. Therefore, just as the electrostatic potential of a material is negative, positive or zero, the corresponding ZP of that material will be negative, positive or zero. The condition under which a material exhibits no electrostatic potential and therefore a ZP of zero is known as the material's isoelectric point (IEP). Materials which are at their IEP in a given liquid appear to have a neutral character, i.e. an electrostatic potential of or near 0 mV.

In the present invention when a filter material exhibits its IEP or a ZP close zero (i.e. ZP=−10 mV<IEP<+10 mV, preferably ZP=−5 mV<IEP<+5 mV) in the liquid to be filtered, the filter will retain particles of any electrostatic character which are smaller than the filter pore size due to attractive Van der Waals forces between the filter material surface and the particles. A filter material which does not exhibit its IEP in the liquid to be filtered, i.e. a filter which has a substantial electrostatic potential in the liquid to be filtered (i.e. $ZP \leq −10$ mV or ZP>+10 mV, preferably $ZP \leq −5$ mV or ZP>+5 mV) will not retain particles smaller than its pore size which exhibit a electrostatic potential (or ZP) of the same sign (like-charged particles).

The electrostatic potential of a (filter) material in a given liquid can be adjusted through known surface modification techniques to become essentially neutral, i.e. to exhibit an IEP. However, some filter materials may exhibit an IEP in a given liquid without further adjustment through surface modification.

It is important to note, that when the liquid to be filtered contains high amounts of dissolved ions (i.e. any liquid exhibiting a high ionic strength, e.g. greater than 0.1-1 mol/l) almost any material surface in contact with this liquid will be substantially neutral (i.e. its ZP will be in the range of −10 mV<ZP<+10 mV, preferably −5 mV<ZP<+5 mV). Consequently, in such a liquid any material surface will attract particles of any electrostatic character. This phenomenon is often described as an ion screening effect, i.e, dissolved ions can "screen" the electrostatic potential of a material surface to the effect that the potential decays more or less rapidly with distance from the material surface depending on the amount of dissolves ions. So in liquids with low concentrations of ions (weak electrolytes), the electrostatic potential decays very slowly with distance and reaches a long way into the surrounding liquid; in liquids with high concentrations of dissolved ions (strong electrolyte), the electrical potential decays very rapidly with distance leading to a substantially neutral surface.

Liquids

The present invention will work in aqueous as well as non-aqueous fluids such as organic solvents (alcohols, etc). Especially in organic liquids with relatively high dielectric constants, i.e. dielectric constants greater than 10, as these liquids behave similarly as aqueous liquids. Additionally, it works with fluids of different viscosities, ionic strengths and dielectric constants. It is effective for removing any contaminants such as organic and inorganic particles, ionic species, molecular, oligomeric and polymeric materials as well as physically dissolved gas from such fluids, In aqueous fluids, one means for selecting the proper filter material with a substantially neutral surface is the typical pH range of the fluid as it is to be filtered. Thus one can ensure that the filter remains substantially neutral in the fluid at that given pH range. In non-aqueous fluids, pH is not a relevant value. Here, the proton acceptor/donor properties of the filter material and the liquid as well as the ionic strength of the liquid will determine the electrostatic potential of the filter material.

Particles

The filters of the present invention are capable of removing inorganic and organic particles, whether crystalline and non-crystalline, elastic or non-elastic, in sizes ranging from 10 nm to 100,000 nm. More specifically, a filter of the present invention is capable of removing solid particles as well as colloidal particles such as liposomes, lipid containing colloids, organelles, DNA aggregates, protein and protein aggregates, as well as aggregates of any combination of colloidal particles.

Filter Material

Filters useful in this present invention can be made from a variety of materials including but not limited to, glass fiber and fabric, metals such as stainless steel, nickel, chromium and alloys and blends thereof, ceramics, plastics and combination thereof. Preferably, the filter material is made of a plastic e.g. from cellulosic materials such as regenerated cellulose or nitrocellulose, thermoplastic materials such as polyolefins, including polyethylene such as ultrahigh molecular weight polyethylene, polypropylene and the like polyolefins; homopolymers, copolymers or terpolymers of polyolefins; polyvinylidene fluoride (PVDF), PTFE resin, PFA and other fluorinated resins, in particular, perfluorinated thermoplastic resins; polyvinyl chloride homopolymers (PVC) and copolymers; nylons; polyamides; polysulphones; modified polysulphones such as polyethersulphones, polyarylsulphones and polyphenylsulphones; polyimides; polycarbonates; polyesters such as PET and the like and composites thereof. Preferred are thermoplastic filter materials such as polyolefins including polyethylene such as ultrahigh molecular weight polyethylene and polypropylene, sulphones such as polysulphones, polyethersulphone, polyarylsulphones and polyphenylsulphones, PTFE, PVDF, PFA and other fluorinated thermoplastic resins, nylons such as Nylon 66 and composites thereof.

Filter Structure

The structure of the filter may be any that are typically used in liquid filtration such as porous filter sheets, composite filter sheets (two or more layers formed on each other to form an integral sheet structure), any kind of porous membrane, woven or non-woven mats or fabrics, depth filters, hollow fibers and the like. Preferably, they are porous membranes or composite membranes in flat sheet form, pleated form or spiral wound form.

Surface Modification of Filter Materials

The filter materials can be modified in a variety of manners depending in large part upon the nature of the material from which is it made. For all filters, the key is to ensure that the entire inner and outer surface, including the one within the pores is modified to ensure that there is adequate retention characteristics. For example, metal filters may be modified by passivation, oxidation, or coating of the metal surfaces of the filter as is well known in the art. Ceramics may be modified by oxidation or inorganic and organic surface chemistry modifications or coatings. Polymers may be modified by grafting, oxidation, adsorption, introduction of modifier materials into the polymer mix before or during formation, post formation coatings, whether crosslinked or otherwise, and the like. Such techniques are well known to one of ordinary skill in the art.

One method of making a material with a substantially neutral surface in a given liquid is to modify the surface of the material. In doing so, the new surface substantially covers the underlying filter material and becomes in effect the exposed surface of the filter. The filter performance, i.e. its retentiveness for particles smaller than the pore size of the filter, will thus depend on the electrostatic character of the applied modifying layer being exposed to the liquid.

Various types of energy are known to modify the surface chemistry of polymeric filters. Any of these energy sources may be used to form a substantially neutral surface. Included but not limited in this group are energy sources such as gamma radiation, x-ray radiation, Corona discharge, electron beam, laser excitation and ultraviolet light.

One can use various acids or bases (depending upon the filter material selected and the fluid in which it will be used) to modify the filter surfaces. For examples, acids or bases can be used to oxidize the surfaces of various metal, glass, ceramic or plastic filters.

Preferably, the method for creating a substantially neutral surface is to use surface modification chemistries. Typically, these methods utilize one or more monomers that are applied to the surface of the filter. In doing so, the monomers substantially cover the underlying filter surface and become in effect the outer surface of the filter. Most common methods include simply coating the material onto the surfaces of the filter and relying upon a mechanical holding of the coating to itself to maintain the outer surface chemistry, cross-linking the monomers to the filter surface, see for example U.S. Pat. No. 4,618,533 the teachings of which are incorporated herein its entirety, or grafting the monomers onto the filter surface, see for example U.S. Pat. Nos. 3,253,057; 4,151,225; 4,278,777 and 4,311,573 the teachings of which are incorporated herein.

Selected monomers include those of the patents cited above. More preferred are acrylate or acrylamide monomers such as acrylic acid, 2-acrylamido-2-methyl-1-propanesulfonic acid, sulfylpropylacrylate or N,N-dimethylacrylamide (DMAm) and methacrylate or methacrylamide monomers such as methacrylic acid and blends of two or more of the above.

Preferably these monomers are used in conjunction with a photoinitiator, preferably a water soluble photoinitiator such as Irgacure 2959 and a cross linker, A preferred cross linker is N,N'-methylenebisacrylamide(MBAm).

A second preferred system uses no monomer. Instead it uses the MBAm cross linker alone. It has been found that this surface treatment alone is sufficient to provide a relatively neutral surface useful in this invention.

One method of applying the surface treatment is as follows: either system, the monomer alone or in combination with the photoinitiator or preferably in combination with the photoinitiator and/or cross linker, or the cross linker alone, is prepared in water. The filter to be treated is pre-wet in alcohol, exchanged in water and then soaked in the selected solution. It is then subjected to a UV treatment to cause the surface treatment to cross link and bond to the surfaces of the filter. The filter is then washed and dried and is then ready for use.

An alternative method of applying the surface treatment is to prepare a self wetting solution through the use of a water miscible organic such as tert-butyl alcohol or 2-methyl-2,4-pentanediol (10-20% by weight) with the selected chemistry and apply it directly to the dry surface of the filter.

In either method, the use of positive pressure or a vacuum may be used to enhance the penetration rate and effective surface area coated by the surface treatment.

An example of a modified filter can be made by taking an ultra high molecular weight polyethylene membrane filter available from Millipore Corporation of Bedford, Mass. and applying a solution of 0.26 Kg Irgacure 2959 initiator, 6 Kg acrylic acid, and 1.62 Kg MBAm in 192.12 Kg deionized (DI) water. The membrane filter is prewet in isopropanol, and exchanged in DI water for several minutes. The membrane filter is then soaked in the solution for several minutes, and after squeezing out the excess liquid, irradiated with a Fusion "H" UV lamp at 30 ft./min under nitrogen. The membrane filter is then rinsed in water in two successive baths and dried under hot air.

The filter may be used as a flat sheet such as a cut disk of 25 or 47 mm diameter. It may also be used as a sheet in a cassette cartridge as may be used in tangential flow or normal flow filtration mode such as a Pellicon® cassette available from Millipore Corporation of Bedford, Mass.

Preferably, it is formed as one or more layers and made into a pleated or spiral wound cartridge device. Such devices are well known in the art.

In one embodiment of either the flat sheet or pleated, or spiral wound device, the device contains a series of two or more filters, each modified so that their surfaces have a low ZP or are at IEP in the liquid in which they are used and arranged so that there is a progression of smaller and smaller particle size retention as the liquid progresses from the upstream side to the downside side of the device.

In a further embodiment, they may be formed as hollow fiber devices.

The pore size of the filter can vary widely from that clearly within the ultraporous range (less than 0.01 microns average or nominal diameter) to those in the traditional microporous range (0.05 microns to 10 microns average or nominal diameter, preferably 0.1 to 1 micron average or nominal diameter). The advantage of the present invention is that one can use a larger pore size and still obtain enhanced filtration of particles that are smaller than selected pore size and can do so at enhanced flow rates and reduced pressure drops. Thus one is no longer limited to sieving or size exclusion as the primary or sole filtering mechanism. For example, the present invention provides a filter with a traditional pore size rating of 0.3 microns with an LRV of greater than 3 for 0.1 microns particles with a pressure drop which is less than $1/10$ that of a 0.1 microns rated "sieving filter" (i.e. a filter with a nominal or rated pore size of 0.1 microns). The 0.1 microns "sieving filter" has an LRV of less than 3, generally about 2 for 0.1 microns particles.

Additionally, one can obtain enhanced filtration or LRV levels for the "same pore size" membrane, e.g. one can obtain higher levels of LRV (LRV>3, preferably 5 or greater) over the same pore size membrane without the selected ZP in the same fluid at the same pH.

Further, the filters of the present invention are capable of not only filtering particles larger than their nominal pore size but is also capable of removing a substantial amount of particles that are smaller than the nominal pore size of the filter, something not accomplished with sieving only filters. So for example, filters of the present invention are capable of a particle reduction of at least 3 LRV for particles having an average diameter smaller than the nominal pore size of the filter.

EXAMPLES

Experiments were performed to illustrate the invention described above. The ZP of differently charged model particles (negatively charged polystyrene latex beads (PSL), positively charged surface modified tertiary amine PSL, and positively charged silicon nitride particles ($Si_3N_4$)) as well as different filter materials that were surface modified as well as unmodified filter materials were measured in different liquids (hydrofluoric acid (HF) and potassium chloride solution (KCl)) at different pH values. The enhanced retention of these charged model particles by mechanisms other than sieving was demonstrated for these filters. From the results, a clear correlation is seen between the ZP of the respective filter material and its retentive properties for the differently charged model particles.

Zeta Potential Measurements

A general description of ZP measurements can be found in the text of Robert Hunter, *Zeta Potential in Colloid Science*, Academic Press 1984, the teachings of which are incorporated herein by reference.

The determination of the ZP of particles in different liquids was determined according to U.S. Pat. No. 4,602,989.

The determination of the ZP of porous materials in different liquids was determined according to WO8700285A1.

Measurement of Particle Retention

Two test systems were employed to measure particle retention of test filters in different liquids. The first system uses HF of different pH values as a test liquid and filters assembled in cartridges. The second system uses KCl of different pH values as a test for 47 mm diameter filter discs.

i) Test System for Filters Assembled in Cartridges for Tests in Hydrofluoric (HF) Acid A recirculating etch bath (REB) system as shown in FIG. 1 was used to test the performance of filters assembled in cartridges. A centrifugal pump 1 circulated the liquid (HF) coming from the recirculating etch bath 3 through the filter 5. The system components were constructed of PFA (poly(tetrafluoroethylene-co-perfluoro(alkylvinylether)) or poly(tetrafluoroethylene-co-hexafluoropropylene and polyvinylidene fluoride (PVDF) and the entire system contained approximately 60 liters of liquid. The circulation rate varied with filter type; being approximately 40 lpm for most filters. The particle concentration in the recirculating etch bath 3 was monitored continually with an HSLIS M65 optical particle counter 7 (Particle Measuring Systems, Boulder, Colo.) Liquid was withdrawn from the recirculating etch bath 3 by a peristaltic pump 9 and passed through the particle counter 7. The M65 was a four-channel monitor with channel sizes of 0.065 μm, 0.10 μm, 0.15 μm and 0.20 μm. A flow controller 10 was used downstream of the particle counter 7 along with a pressure gauge 11. The sample was returned to a weir 12 within the bath 3. The weir and bath were both connected to the pump 1 for recirculating the fluid through the bath. All testing was performed in a Class 100 cleanroom.

Figure 2:
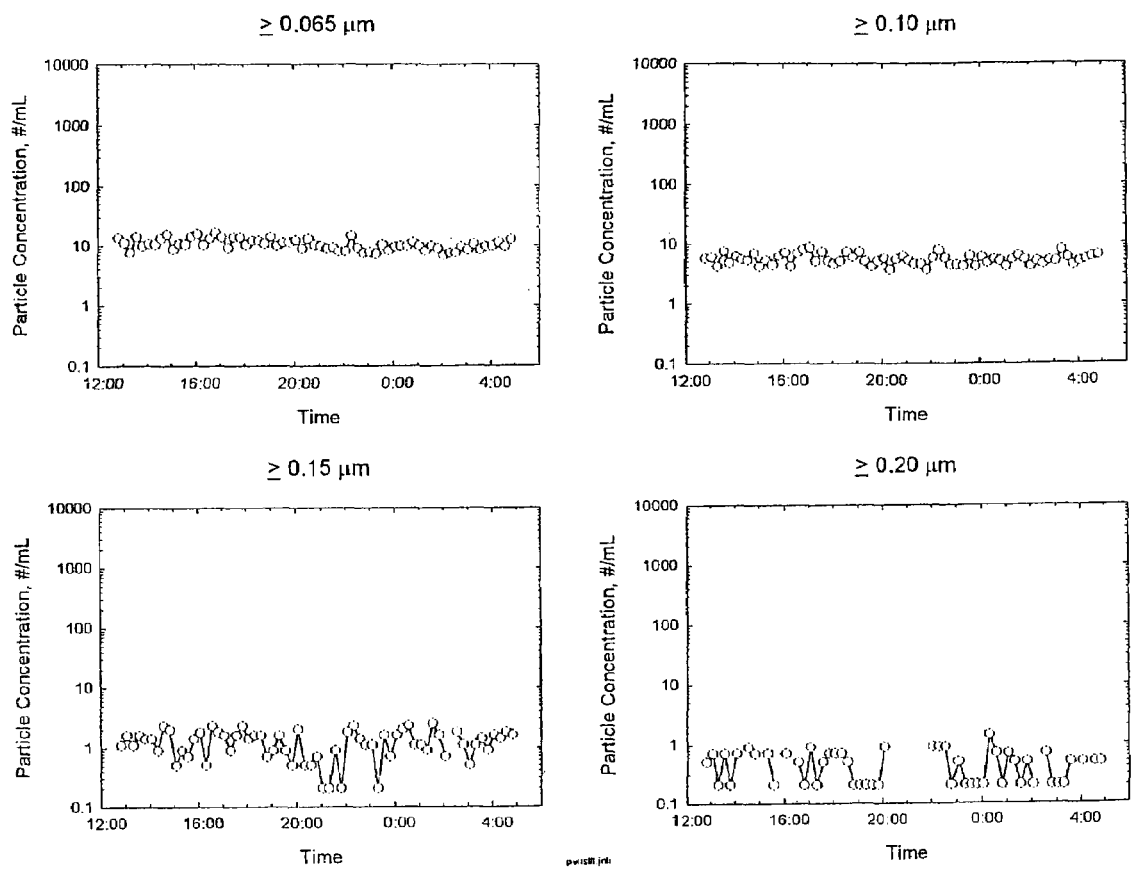
FIG. 2 The measured background particle concentrations in the test system for cartridges.

FIG. 2 shows typical background particle concentrations of the system. The background particle concentration stemmed from the shedding of particles from wetted parts of the system, i.e. when no excess particles were present. Concentrations around 10 particles/ml≧0.065 μm were routinely achieved. The data in FIG. 2 were collected over an 18-hour time period.

Test Procedure

Particle suspensions of known concentration were prepared by dilution of a stock suspension and measured with the M65 particle counter to determine the final concentration. Measured volumes of these suspensions were placed into the weir 12 of FIG. 1 (up-stream of the filter). The particle counter 7 monitored the concentration of particles in the bath (down-stream of the filter). The peak concentration of particles ≧0.065 μm in the bath 3 was used to calculate filter LRV. The concentration of particles ≧0.065 μm at the filter inlet was usually near 150,000 particles/ml. The concentration in the bath prior to adding particles to the weir 12 was typically 50±20 particles/ml≧0.065 μm. Hence, the minimum detectable and substantial increase in concentration down-stream of the filter 5 was approximately 150 particles/ml ≧0.065 μm. This increase corresponds to an LRV of 3 ($\log_{10}[150000/150]$). Although some filters 5 may have had better retention, the maximum LRV detected by this method was 3.

The volumes of HF added were chosen to yield evenly spaced molar concentrations on a logarithmic scale. The relationship between molar concentration, weight %, dilution ratio, and approximate solution pH are shown in Table I. The dissociation constant used in calculating pH was 0.00035.

TABLE 1

HF Concentration Relationships

| Molar Concentration (m/l) | HF Concentration (weight %) | Approximate Dilution Ratio | pH |
|---|---|---|---|
| $10^{-3}$ | 0.0017 | 30,000:1 | 3.4 |
| $10^{-2}$ | 0.017 | 3,000:1 | 2.8 |
| $10^{-1}$ | 0.17 | 300:1 | 2.3 |
| 1 | 1.7 | 30:1 | 1.8 |
| 3 | 5.1 | 10:1 | 1.5 | ii) Test System for Disc Flat Sheet Filters of 47 mm Diameter in KCl

Figure 3:
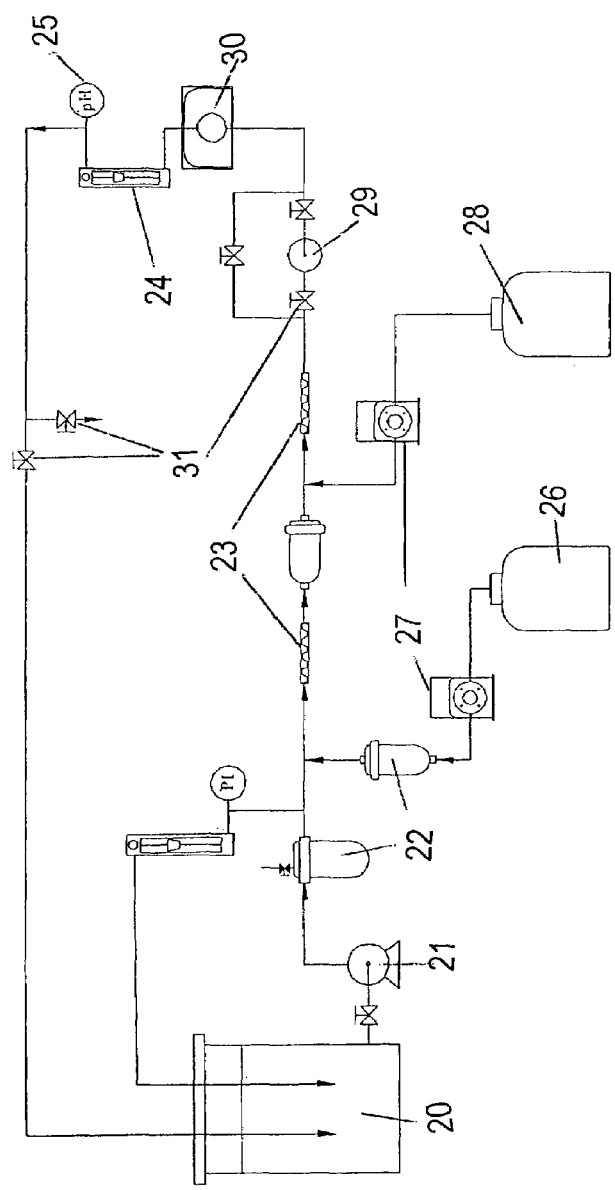
FIG. 3 test system for tests in KCl for 47 mm filter discs.

The experimental system is shown in FIG. 3. It consisted of a high density polyethylene holding tank 20, a multistage circulation pump 21, prefilters 22, static mixers 23, flow meters 24, pH meters 25. All parts as well as the piping in contact with liquid after the prefilter are made from polyvinylidene difluoride or glass to ensure low particle shedding and chemical resistance. The holding tank was filled with ultrapure distilled water, and the system was run either in recirculating mode for stabilization in double distilled water or in drain mode when the filter was challenged by particles. A 0.1 μm pore size prefilter was used after the circulation pump and after the first static mixer. The pH was adjusted by continuously pumping either HCl or KOH from tank 26 into the main line before the first static mixer by using a peristaltic pump 27 and again a prefilter 22. Similarly, particles were introduced into the system before the second static mixer by continuously pumping small amounts of highly concentrated particle suspensions from a tank 28 into the main line upstream of the test filter 29 yielding a challenge particle concentration of 300,000 particles per ml. Particle counts were monitored with a M65 Optical Particle Counter 30. Also included were various valves 31 for controlling flow and draining the system.

Test Procedure

For each test, a new 47 mm disc filter was installed in the test filter holder and flushed with recirculating ultrapure water for several hours to achieve a low background particle concentration. Particle retention by the filter was measured as a function of pH. The filter was initially challenged with $Si_3N_4(+)$, PSL(+) or PSL(−) particles at the lowest desired pH (achieved by adding HCl) and the pH was then incrementally increased by continuously adding lower amounts of HCl and eventually increasing amounts of KOH. Particle retention was measured for each pH value after equilibration of the system was awaited (about 10 min). The log reduction value (LRV) was calculated using the following formula:

$$LRV=\log(\text{feed particle concentration/permeate particle concentration})$$

Test Particles

A variety of particles used to challenge the filters together with some of their properties are listed in Table II.

TABLE II

Challenge Particles

| Material | Specified Particle size | Approximated IEP in pH units | Supplier |
|---|---|---|---|
| PSL(−) | 102 nm | 2 | Duke Scientific |
| PSL(+) | 90 nm | 10 | Bang Laboratories |
| $Si_3N_4(+)$ | <325 mesh | >6 | Alfa Aesar |

Figure 4:
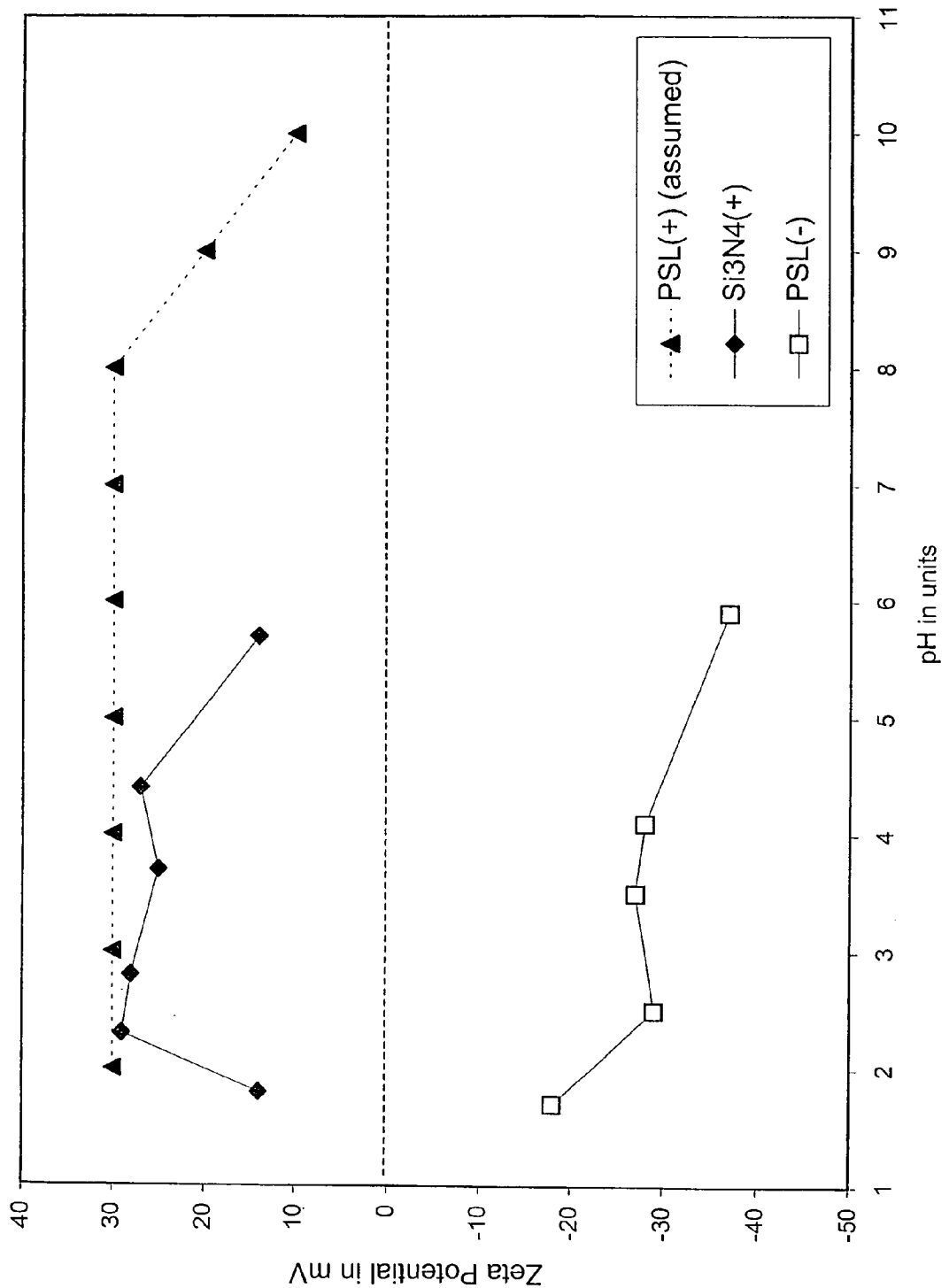
FIG. 4 shows the Zeta Potential of particles in KCl as function of pH.

Monodisperse polystyrene latex (PSL) particles with two different surface characteristics were used: PSL(−) is a plain PSL particle, and PSL(+) is a surface modified PSL particle exhibiting tertiary-amine groups at the surface. Furthermore, silicon nitride ($Si_3N_4$) suspensions were prepared from polydisperse powders ($Si_3N_4(+)$). FIG. 4 shows the measured ZP of the PSL(−) and the $Si_3N_4(+)$ particles as function of the pH of the surrounding liquid. From FIG. 4 it was observed, that PSL(−) particles are negatively charged over the measured interval. They were therefore used as a model particle representing a negatively charged entity. Similarly, $Si_3N_4(+)$ exhibits a positive Zeta potential over the measured pH interval and was used as a model particle representing a positively charged entity. The assumed ZP dependence on pH for PSL (+), i.e. PSL particles exhibiting tertiary-amine groups at their surface, is also depicted in FIG. 4. PSL(+) particles are expected to exhibit a positive charge over the shown pH range due the protonation of the amine group (see FIG. 4). No actual data for PSL(+) was available however at the time being.

Example 1

Filters Tested

A variety of microporous polymeric filter membranes listed in Table III together with their properties was tested with respect to their retentiveness towards the challenge particles listed in Table II. The pore size of all filters was between 0.15 µm and 0.3 µm. Under sieving conditions, these filters would be expected to have poor (30-50%) retention of 0.1 µm PSL spheres. The Millipore filters were surface modified according to U.S. Pat. No. 4,944,879 using different functional monomers to influence the surface properties of the membranes.

TABLE III

Properties of filters tested

| Filter | Name | Material | Pore Size (µm) | Surface Modification |
|---|---|---|---|---|
| Filter #1 | N/A | UPE [a] | 0.25 | AA [e], MBAm [f], I 2959 [g] |
| Filter #2 | Millipore Corp.: Guardian DEV | UPE | 0.15 | DMAM [h], MBAm, I 2959 |
| Filter #3 | US Filter.: Mega-Etch | PSF [b] | 0.15 | Not known |
| Filter #4 | Millipore Corp.: Etchgard HP | UPE | 0.25 | AA, TAA [i], I 2959 |
| Filter #5 | Pall: Superetch | PVDF [c] | 0.3 | Not known |
| Filter #6 | N/A | UPE | 0.25 | No surface modification |
| Filter #7 | N/A | UPE | 0.25 | DMAM, MBAm, I 2959 |
| Filter #8 | N/A | PTFE [d] | 0.2 | DMAM, MBAm, APMAm [j], I 2959 |

[a] Ultra High Molecular Weight Polyethylene
[b] Polysulfone
[c] Polyvinylidene difluoride
[d] Polytetrafluoroethylene
[e] Acrylic Acid
[f] N,N-Methylenebis(Acrylamide)
[g] 4-(2-hydroxyethoxy)Phenyl-(2-Propyl)Ketone
[h] N,N-Dimethylacrylamide
[i] Triallylamine
[j] N-(3-Aminopropyl)methacrylamide HCL

Zeta Potential of Test Filters

Figure 5:
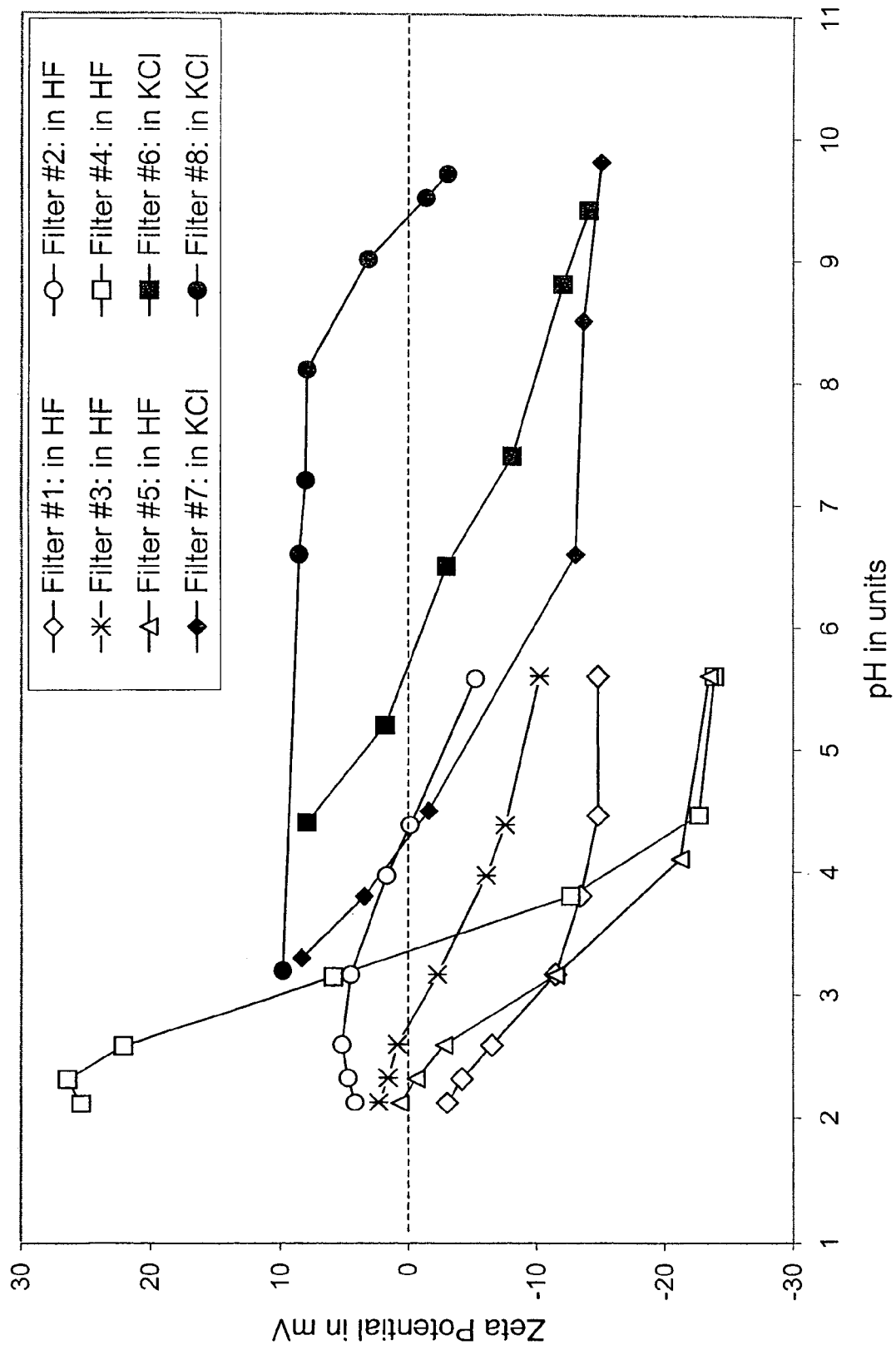
FIG. 5 shows the Zeta Potential of test filters in HF or KCl as function of pH.

FIG. 5 shows the ZP (in millivolts) of the filters listed in Table III characterized in either KCl or HF as a function of pH. In the case of filters characterized in KCl (open symbols) the test liquid was a 0.001 mol/l KCl solution of double distilled high purity water and the pH was adjusted by adding potassium hydroxide (KOH) to attain pH values higher than 7, and hydrochloric acid (HCL) to attain pH values of lower than 7. In the case of filters characterized in HF (filled symbols), the pH was adjusted by adding HF to double distilled high purity water. All filters show a trend towards higher (more positive) ZP values for decreasing pH values due to the adsorption of positively charged hydronium ions ($H^+$). Accordingly, most filters cross the line of zero ZP, i.e. the IEP of point of zero charge at some pH value. At this pH value the filter is essentially neutral and will therefore according to this invention retain particles of all possible charge characteristics, i.e. negatively charged, positively charged, or neutral.

Filter Retention

Figure 6:
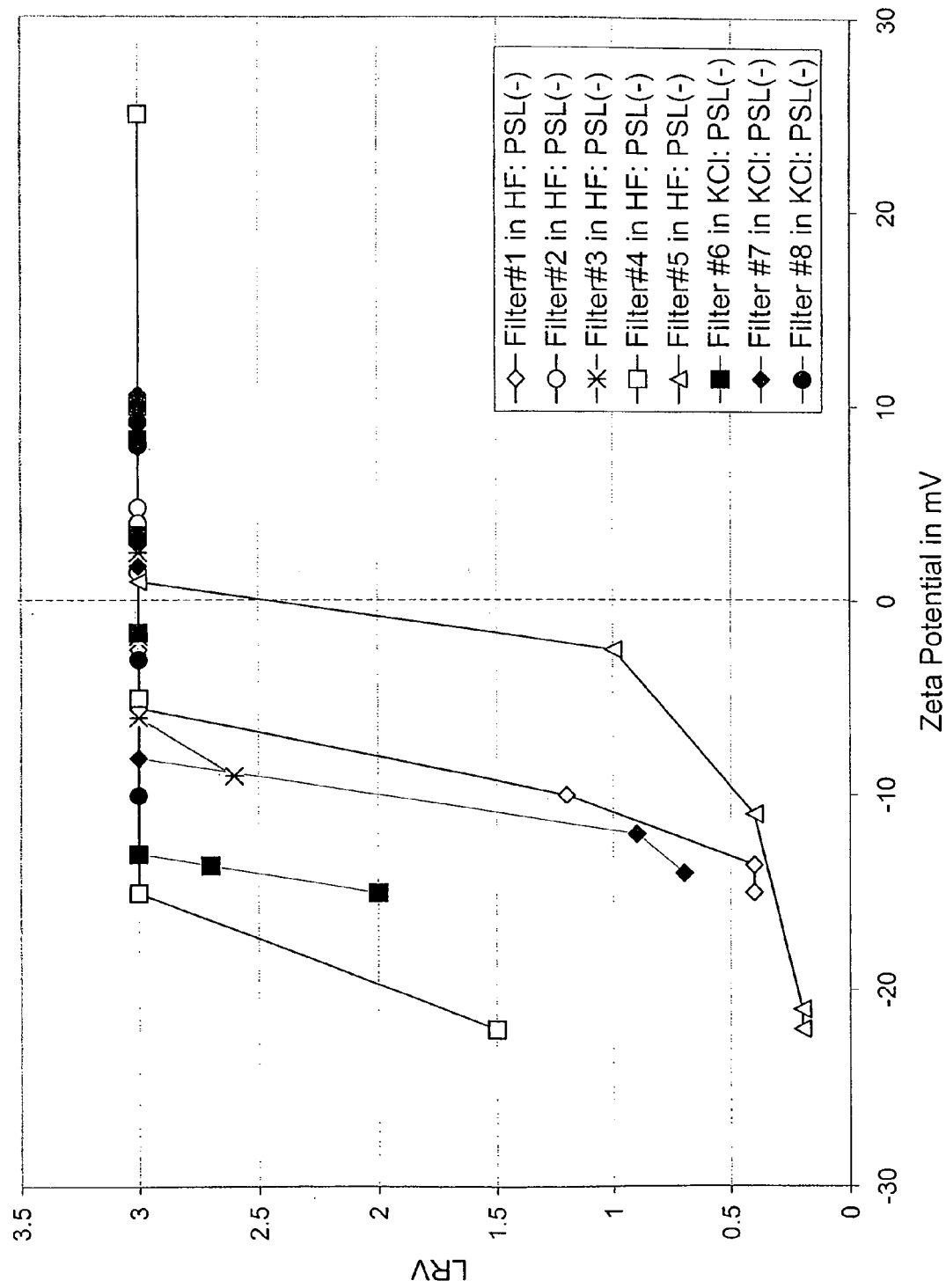
FIG. 6 shows test filter retentiveness in log reduction values (LRV) for negatively charged PSL(−) particles in KCl or HF of different pH versus the filter Zeta Potential in the respective test liquid.

FIG. 6 shows the LRV of negatively charged PSL particles (PSL(−)) from HF and KCl respectively for the different test filters listed in Table III as a function of the ZP of the respective filters. Most likely due to electrostatic interactions between the filter material and particle material, the negatively charged particles, being much smaller than the filter pore size, are retained at an LRV of greater than 3 by all filters for positive filter ZP. However, the data also shows that negatively charged particles are retained by up to 3 LRV also by filters with a slightly negative ZP. Filter 4, e.g., is capable of retaining PSL(−) with a LRV of greater than 3 at a filter ZP of approx. −15 mV. Similarly, the other filters retain PSL(−) with a LRV of up to 3 even though they exhibit a negative ZP. For small negative filter ZP the attractive Van der Waals interaction overcomes the repulsive electrostatic interaction between the filter material and the particle material and the particle is retained by the filter.

Figure 7:
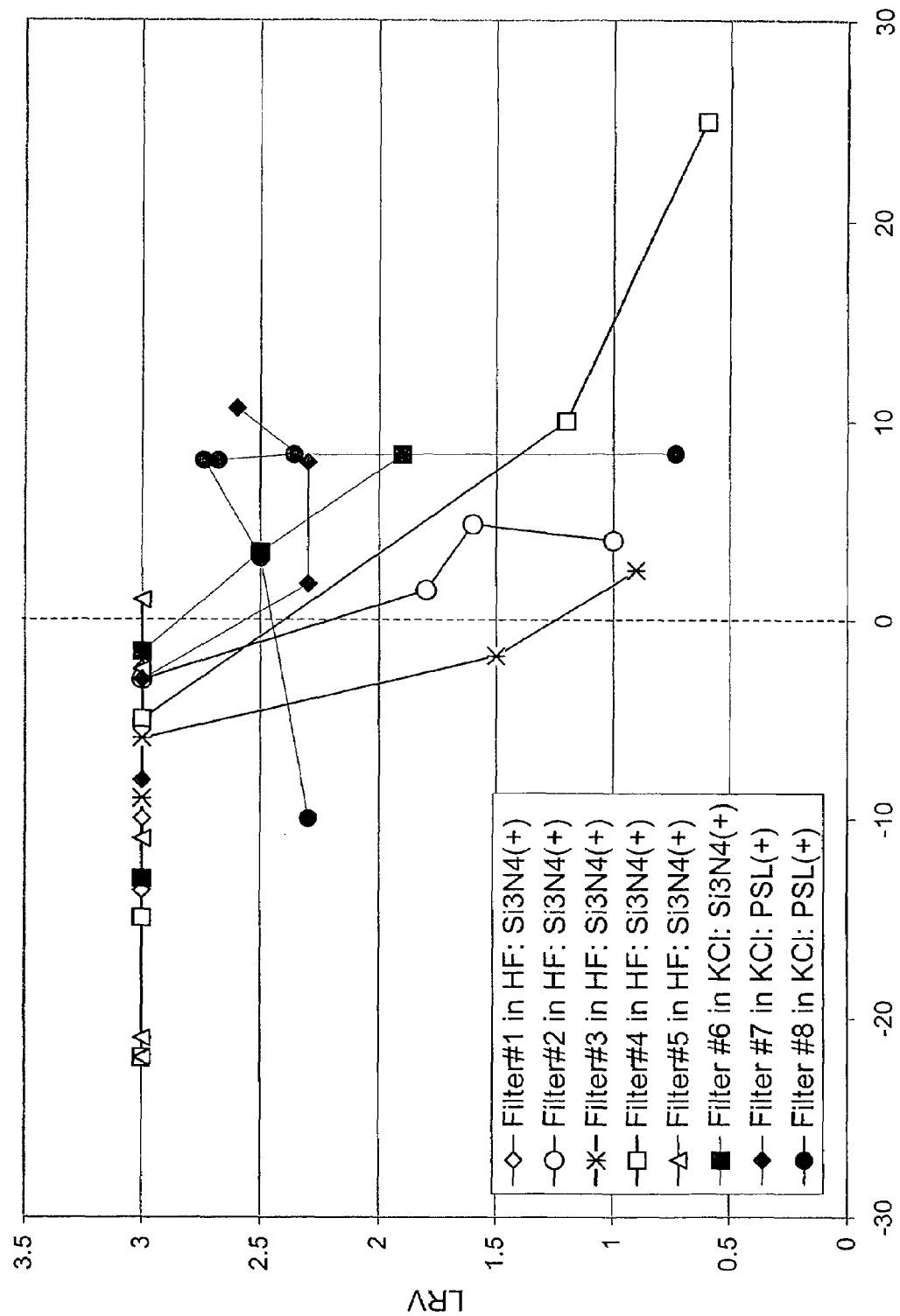
FIG. 7 shows test filter retentiveness in log reduction values (LRV) for positively charged $Si_3N_4$(+) and PSL(+) particles in KCl and HF of different pH versus their Zeta Potential in the respective test liquid.

FIG. 7 shows the LRV of positively charged PSL particles (PSL(+)) and positively charged $Si_3N_4$(+) particles from HF and KCl respectively for the different test filters listed in Table III as a function of the ZP of the respective filters. Again, most likely due to electrostatic interactions between the filter material and particle material, the positively charged particles, being much smaller than the filter pore size, are retained at an LRV of greater than 3 (but at least at an LRV of 1.5) for all filters for negative filter ZP. However, similarly to the data for negatively charged particles in FIG. 6, the data shows again that positively charged particles are retained by up to 3 LRV also by filters with a slightly positive ZP. Again, for small positive filter ZP the attractive Van der Waals interaction seem to overcome the repulsive electrostatic interaction between the filter material and the particle material and the particle is retained by the filter.

The data in FIGS. 6 and 7 shows, that particles of any charge characteristic (positive or negative) can be efficiently retained by filters which exhibit no or a relatively small ZP in the respective filter liquid.

Example 2

Filters Tested

The conventional filters tested in this example had high IEP (pore size rating 0.15 µm), medium IEP (pore size rating 0.15 µm), and low IEP (pore size rating 0.3 µm). A surface-optimized filter was also tested (pore size rating 0.25 µm). The pore size rating of all filters, based on IPA bubble point, was between 0.15 µm and 0.3 µm.

The modified filter (surface-optimized) was made by taking an ultra high molecular weight polyethylene membrane filter available from Millipore Corporation of Bedford, Mass. and applying a solution of 0.26 Kg Irgacure 2959 initiator, 6 Kg acrylic acid, and 1.62 Kg MBAm in 192.12 Kg deionized (DI) water. The membrane filter is prewet in isopropanol, and exchanged in DI water for several minutes. The membrane filter is then soaked in the solution for several minutes, and after squeezing out the excess liquid, irradiated with a Fusion "H" UV lamp at 30 ft./min under nitrogen. The membrane filter is then rinsed in water in two successive baths and dried under hot air.

Figure 8:
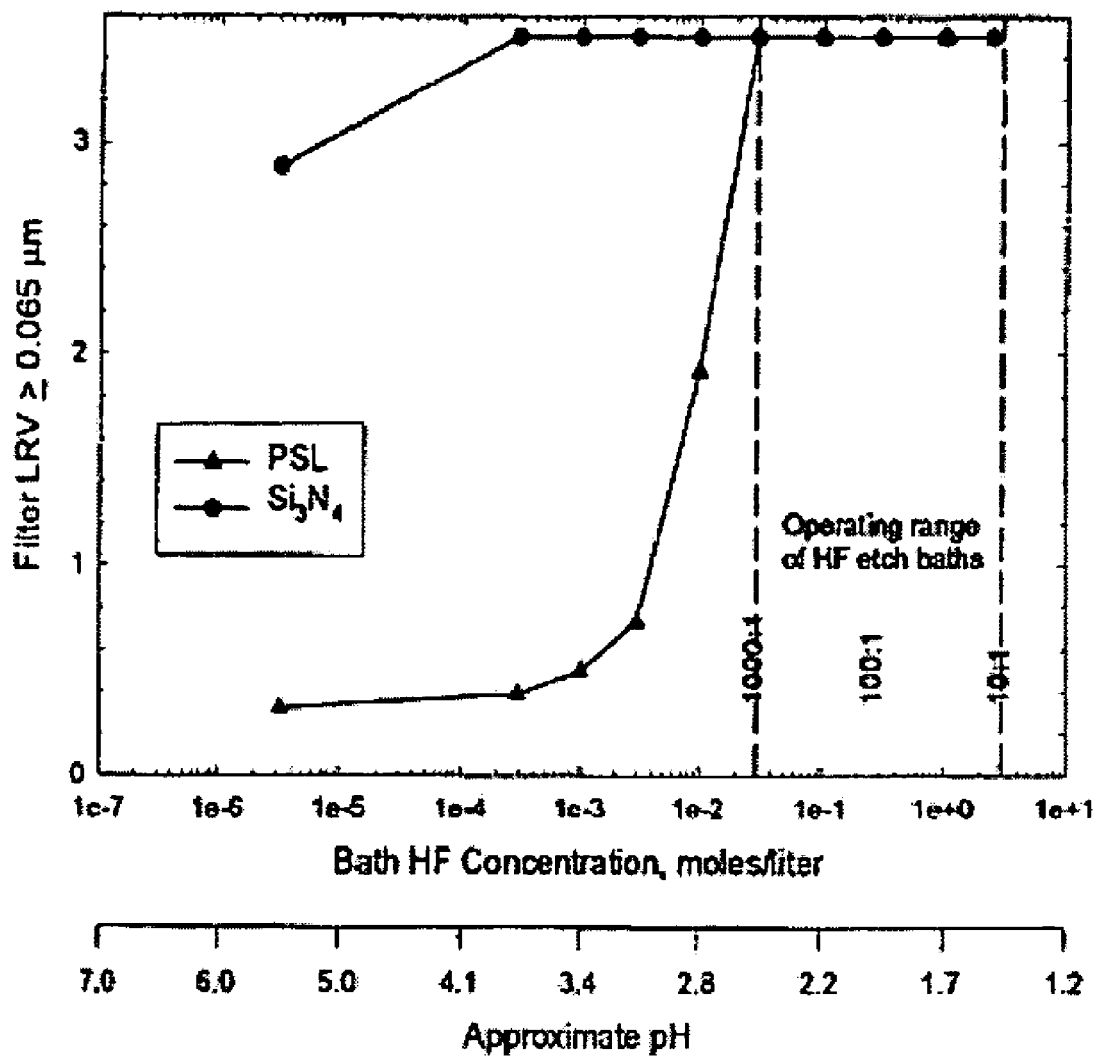
FIG. 8 illustrates particle retention by a modified porous filter in an embodiment of the present invention.

FIG. 8 shows LRV as a function of HF concentration for a surface-optimized filter. In the range of interest in dilute HF baths, both PSL and $Si_3N_4$ particles are captured with an LRV of ≧3.5. When the HF is more dilute than 1000:1, this filter has a negative charge and does not capture PSL very effectively. When the HF concentration is stronger than 1000:1, this filter has little or no charge and retains particles by interception and diffusion regardless of the particle charge.

Table IV summarizes filter LRV data for a high IEP filter (Guardian™ DEV), a medium IEP filter (Mega-Etch), a low IEP filter (Pall Superetch), and a surface optimized filter at a specific HF concentration. Data are presented from low IEP particles (PSL) and high IEP particles (Si$_3$N$_4$). From this table, the surface optimized filter has the best particle retention.

TABLE IV

FILTER RETENTION OF HIGH AND LOW IEP PARTICLES

| | Filter LRV (particles ≧0.065 μm) | | | | | |
|---|---|---|---|---|---|---|
| | Low IEP particles (PSL) | | | High IEP particles (Si$_3$N$_4$) | | |
| Filter | 0.05 wt % HF | 0.5 wt % HF | 5 wt % HF | 0.05 wt % HF | 0.5 wt % HF | 5 wt % HF |
| High IEP | ≧3.5 | ≧3.5 | ≧3.5 | 1.4 | 0.9 | 1.4 |
| Medium IEP | ≧3.5 | ≧3.5 | ≧3.5 | 1.3 | 0.9 | 2.0 |
| Low IEP | 0.9 | ≧3.5 | ≧3.5 | ≧3.5 | ≧3.5 | ≧3.5 |
| Surface-Optimized | ≧3.5 | ≧3.5 | ≧3.5 | ≧3.5 | ≧3.5 | ≧3.5 |

Other Particle Types

Several other types of particles were used to ensure that the testing with PSL and Si$_3$N$_4$ particles was representative of filter performance. The tests results showed that Al$_2$O$_3$, a positively charged particle in the respective filter liquids, was retained like Si$_3$N$_4$. Similarly, Si particles, which are negatively charged in the respective filter liquids, were retained like PSL(−) particles.

What we claim:

1. A device comprising:
   a filter having a nominal pore diameter in between the ultraporous and microporous range, said filter treated with a surface treatment solution comprising 192.12 Kg deionized water, 0.26 Kg initiator, 6 Kg acrylic acid, and 1.62 Kg N,N'-methylenebisacrylamide that is subject to a UV treatment to cross link and bond the surface treatment to a filter surface; said filter surface has a zeta potential of between −5 millivolts and 5 millivolts in a liquid with a pH of from 1.5 to 2.3;
   said filter treated with said surface treatment solution and subject to UV treatment retains positive and negatively charged particles smaller than the nominal pore diameter of the filter from the liquid with and LRV of 3 or more.

2. The device of claim 1 wherein the filter is made from a plastic selected from the group consisting of polyolefins; copolymers or terpolymers of polyolefins; PVDF; PTFE resin; PFA; perfluorinated thermoplastic resins; PVD; nylons; polyamides; polysulphones; polyethersulphones; polyarylsulphones; polyphenylsulphones; polyimides; polycarbonates; polyesters; and blends thereof.

3. The device of claim 1 wherein the filter is made from a polyolefin selected from the group consisting of polyethylene, and polypropylene.

4. The device of claim 1 wherein the filter is made from an ultrahigh molecular weight polyethylene.

* * * * *